United States Patent
Lei et al.

(10) Patent No.: US 12,015,487 B2
(45) Date of Patent: *Jun. 18, 2024

(54) CEASING TRANSMISSION REPETITIONS

(71) Applicant: Motorola Mobility LLC, Chicago, IL (US)

(72) Inventors: Haipeng Lei, Beijing (CN); Chenxi Zhu, Beijing (CN)

(73) Assignee: Motorola Mobility LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/883,557

(22) Filed: Aug. 8, 2022

(65) Prior Publication Data

US 2022/0385405 A1  Dec. 1, 2022

Related U.S. Application Data

(63) Continuation of application No. 16/499,745, filed as application No. PCT/CN2017/078989 on Mar. 31, 2017, now Pat. No. 11,411,684.

(51) Int. Cl.
*H04W 72/04* (2023.01)
*H04L 1/1607* (2023.01)
(Continued)

(52) U.S. Cl.
CPC .......... *H04L 1/1671* (2013.01); *H04L 1/1854* (2013.01); *H04L 1/1867* (2013.01); *H04W 72/20* (2023.01); *H04W 72/0446* (2013.01)

(58) Field of Classification Search
None
See application file for complete search history.

(56) References Cited

U.S. PATENT DOCUMENTS

| 11,411,684 B2* | 8/2022 | Lei ............................. H04L 1/18 |
| 2013/0223412 A1 | 8/2013 | Sambhwani |
| 2016/0119105 A1 | 4/2016 | Jiang et al. |

FOREIGN PATENT DOCUMENTS

| CN | 103312472 A | 9/2013 |
| CN | 103384177 A | 11/2013 |

(Continued)

OTHER PUBLICATIONS

PCT/CN2017/078989, Notification of Transmittal of the International Search Report and the Written Opinion of the International Searching Authority, or the Declaration, PCT, dated Nov. 28, 2017, pp. 1-11.

(Continued)

*Primary Examiner* — Willie J Daniel, Jr.
(74) *Attorney, Agent, or Firm* — Kunzler Bean & Adamson (57) ABSTRACT

Apparatuses, methods, and systems are disclosed for ceasing transmission repetition. One apparatus includes a transmitter that transmits data to a base unit in a first transmission time interval ("TTI"). Here, the data is configured for transmission with a predetermined number of repetitions. The apparatus includes a receiver that receives a control signal from the base unit in a second TTI. The apparatus includes a processor that determines whether the control signal corresponds to the data and, in response to the control signal corresponding to the data, determines whether to cease at least one transmission repetition of the data before the number of repetitions reaches the predetermined number.

20 Claims, 7 Drawing Sheets

(51) Int. Cl.
    *H04L 1/1829*     (2023.01)
    *H04L 1/1867*     (2023.01)
    *H04W 72/20*     (2023.01)
    *H04W 72/0446*     (2023.01)

(56) References Cited

FOREIGN PATENT DOCUMENTS

| CN | 104704762 A | 6/2015 |
|---|---|---|
| CN | 104769877 A | 7/2015 |

OTHER PUBLICATIONS

ZTE et al., "Basic Grant-free Transmission for URLLC", 3GPP TSG RAN WG1 Meeting #88 R1-1701594, Feb. 13-17, 2017, pp. 1-8.

LG Electronics, "Discussion on grant-based and grant-free UL transmissions for latency", 3GPP TSG RAN WG1 Meeting #88 R1-1702490, Feb. 13-17, 2017, pp. 1-9.

Lenovo et al., "HARQ design for UL grant-free URLLC transmission", 3GPP TSG RAN WG1 Meeting #88 R1-1702667, Feb. 13-17, 2017, pp. 1-3.

3GPP, "3rd Generation Partnership Project; Technical Specification Group Radio Access Network; Study on Scenarios and Requirements for Next Generation Access Technologies; (Release 15)", 3GPP TR 38.913 V15.0.0, Jun. 2018, pp. 1-39.

Ericsson, "On UL grant-free transmission", 3GPP TSG-RAN WG1 #88 R1-1701871, Feb. 13-17, 2017, pp. 1-2.

Huawei et al., "UL Grant-free transmission", 3GPP TSG RAN WG1 Meeting #88 R1-1701665, Feb. 13-17, 2017, pp. 1-15.

* cited by examiner

CEASING TRANSMISSION REPETITIONS

FIELD

The subject matter disclosed herein relates generally to wireless communications and more particularly relates to early termination of uplink transmission repetition.

BACKGROUND

The following abbreviations are herewith defined, at least some of which are referred to within the following description.

Third Generation Partnership Project ("3GPP"), Positive-Acknowledgment ("ACK"), Access and Mobility Management Function ("AMF"), Binary Phase Shift Keying ("BPSK"), Carrier Aggregation ("CA"), Clear Channel Assessment ("CCA"), Control Channel Element ("CCE"), Cyclic Prefix ("CP"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Guard Period ("GP"), Hybrid Automatic Repeat Request ("HARQ"), Internet-of-Things ("IoT"), Key Performance Indicators ("KPI"), Licensed Assisted Access ("LAA"), Load Based Equipment ("LBE"), Listen-Before-Talk ("LBT"), Long Term Evolution ("LTE"), LTA Advanced ("LTE-A"), Medium Access Control ("MAC"), Multiple Access ("MA"), Modulation Coding Scheme ("MCS"), Machine Type Communication ("MTC"), Massive MTC ("mMTC"), Multiple Input Multiple Output ("MIMO"), Multi User Shared Access ("MUSA"), Narrowband ("NB"), Negative-Acknowledgment ("NACK") or ("NAK"), New Data Indicator ("NDI"), Network Function ("NF"), Next Generation Node B ("gNB"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Reference Signal ("RS"), Resource Spread Multiple Access ("RSMA"), Round Trip Time ("RTT"), Receive ("RX"), Sparse Code Multiple Access ("SCMA"), Scheduling Request ("SR"), Session Management Function ("SMF"), Sounding Reference Signal ("SRS"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Transport Block ("TB"), Transport Block Size ("TBS"), Time-Division Duplex ("TDD"), Time Division Multiplex ("TDM"), Transmission and Reception Point ("TRP"), Transmission Time Interval ("TTI"), Transmit ("TX"), Uplink Control Information ("UCI"), User Entity/Equipment (Mobile Terminal) ("UE"), Uplink ("UL"), User Plane Function ("UPF"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In 5G networks, URLLC UL traffic may be sent using grant-free based UL transmission configured for a predetermined number of transmission repetitions. Transmission repetitions of the UL traffic is unnecessary once the gNB successfully receives the UL traffic, and the UE continuing the predetermined number of transmission repetitions wastes resources if the gNB has successfully received the UL traffic. However, there is no mechanism for the UE to stop the transmission repetitions when the gNB successfully receives the UL traffic.

BRIEF SUMMARY

Methods for early termination of uplink transmission repetition are disclosed. Apparatuses and systems also perform the functions of the methods. The methods may also be embodied in one or more computer program products comprising executable code.

In one embodiment, a method for early termination of uplink transmission repetition includes transmitting data to a base unit in a first TTI. Here, the data is configured for transmission with a predetermined number of repetitions. The method also includes receiving a control signal from the base unit in a second TTI and determining whether the control signal corresponds to the data. In response to the control signal corresponding to the data, the method includes determining whether to cease at least one transmission repetition of the data before the number of repetitions reaches the predetermined number.

Another method for early termination of uplink transmission repetition includes receiving a data from a remote unit in a first TTI. Here, the data is configured for transmission with a predetermined number of repetitions. The method includes determining whether the data is successfully received and transmitting a control signal to the remote unit in a second TTI. Here, the control signal corresponds to the data and includes an indicator for indicating whether the data is successfully received.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

In order to solve the above described problem of unnecessary UL transmission repetitions after successful reception of the UL data, the gNB or the base unit sends an indicator (e.g., an ACK bit) to the UE and a control signal, such as a UL grant. However, the UE needs to determine whether the UL grant corresponds to the UL data. Accordingly, the gNB uses a TTI offset and/or TTI index to indicate correspondence between the control signal (e.g., UL grant) and the UL data. After determining that the control signal corresponds to the previously transmitted UL data, the UE examines the indicator contained in control signal and stops transmission repetition before reaching the predetermined number of repetitions in response to the indicator indicating that the data was successfully received.

Figure 1:
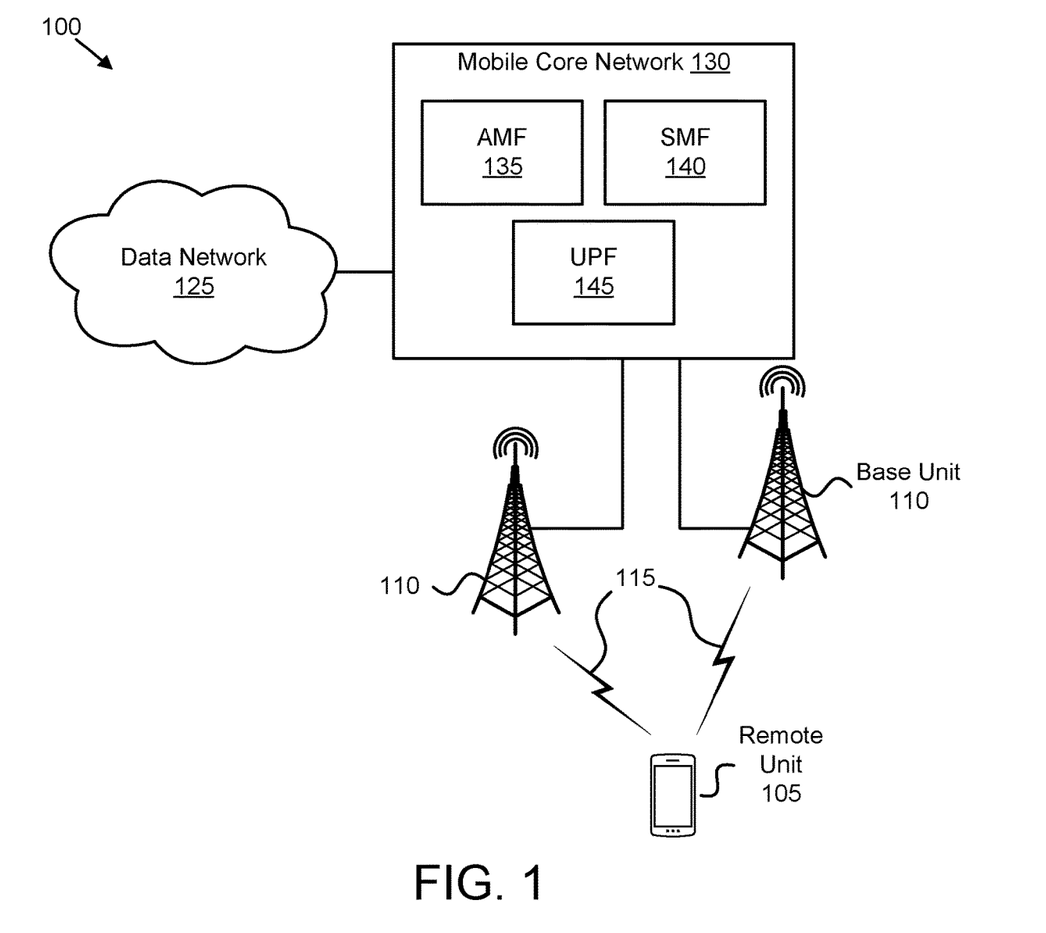
FIG. 1 is a schematic block diagram illustrating one embodiment of a wireless communication system for early termination of uplink transmission repetition.

FIG. 1 depicts a wireless communication system 100 for early termination of uplink transmission repetition, according to embodiments of the disclosure. In one embodiment, the wireless communication system 100 includes remote units 105, base units 110, and communication links 115. Even though a specific number of remote units 105, base units 110, and communication links 115 are depicted in FIG. 1, one of skill in the art will recognize that any number of remote units 105, base units 110, and communication links 115 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE-A or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, user equipment ("UE"), user terminals, a device, or by other terminology used in the art. The remote units 105 may communicate directly with one or more of the base units 110 via uplink ("UL") and downlink ("DL") communication signals, for example a remote unit 105 may send data in a transmission block ("TB") to a base unit 110 via UL communication signals and receive data or control signals from the base unit via DL communication signals. Furthermore, the UL and DL communication signals may be carried over the communication links 115.

The base units 110 may be distributed over a geographic region. In certain embodiments, a base unit 110 may also be referred to as an access terminal, an access point, a base, a base station, a Node-B, an eNB, a gNB, a Home Node-B, a relay node, or by any other terminology used in the art. The base units 110 are generally part of a radio access network ("RAN") that may include one or more controllers communicably coupled to one or more corresponding base units 110. The RAN is generally communicably coupled to one or more core networks, which in turn may be coupled to other networks, like the Internet and public switched telephone networks, among other networks. These and other elements of radio access and core networks are not illustrated but are well known generally by those having ordinary skill in the art. The base units 110 connect to the mobile core network 130 via the RAN.

The base units 110 may serve a number of remote units 105 within a serving area, for example, a cell or a cell sector via a wireless communication link. The base units 110 may communicate directly with one or more of the remote units 105 via communication signals. Generally, the base units 110 transmit downlink ("DL") communication signals to serve the remote units 105 in the time, frequency, and/or spatial domain. Furthermore, the DL communication signals may be carried over the communication links 115. The communication links 115 may be any suitable carrier in licensed or unlicensed radio spectrum. The communication links 115 facilitate communication between one or more of the remote units 105 and/or one or more of the base units 110.

In one embodiment, the mobile core network 130 is a 5G core ("5GC") or the evolved packet core ("EPC"), which may be coupled to other data network 125, like the Internet and private data networks, among other data networks. Each mobile core network 130 belongs to a single public land mobile network ("PLMN"). The present disclosure is not intended to be limited to the implementation of any particular wireless communication system architecture or protocol.

The mobile core network 130 includes several network functions ("NFs"). As depicted, the mobile core network 130 includes an access and mobility management function ("AMF") 135, a session management function ("SMF") 140, and a user plane function ("UPF") 145. Although a specific number of AMFs 135, SMFs 140, and UPFs 145 are depicted in FIG. 1, one of skill in the art will recognize that any number of AMFs 135, SMFs 140, and UPFs 145 may be included in the mobile core network 130.

The AMF 135 provides services such as UE registration, UE connection management, and UE mobility management. The SMF 140 manages the data sessions of the remote units 105, such as a PDU session. The UPF 145 provides user plane (e.g., data) services to the remote units 105. A data connection between the remote unit 105 and a data network 125 is managed by a UPF 145.

As discussed in further detail below, a remote unit 105 may be configured to repeat UL transmissions a predetermined number of times to ensure their reception at the base unit 110. However, the remote unit 105 unnecessarily uses radio resources repeating the UL transmissions once the base unit 110 has successfully received the data. As used herein, the base unit 110 "successfully receives" the data by receiving the uplink signal containing the uplink data at its receiver and successfully decoding the uplink data from the uplink signal. Accordingly, the base unit 110 may indicate that it has successfully received the uplink data, wherein the remote unit 105 ceases any remaining transmission repetitions of the uplink data in response to receiving an indication of success.

Figure 2:
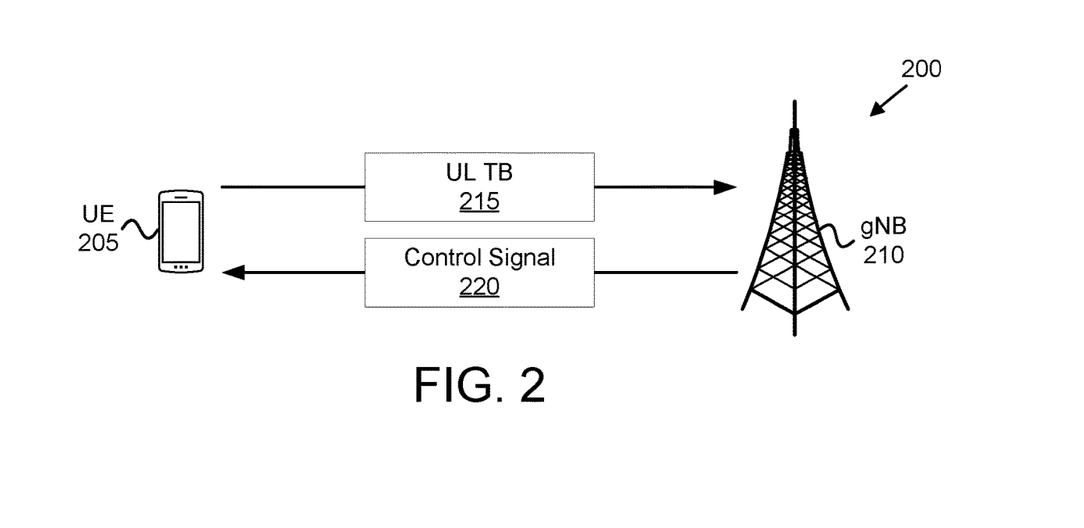
FIG. 2 illustrates one embodiment of a network architecture for early termination of uplink transmission repetition.

FIG. 2 depicts a network 200 used for early termination of uplink transmission repetition, according to embodiments of the disclosure. The network 200 includes a UE 205 and gNB 210. The network 200 depicts a simplified embodiment of the wireless communication system 100. The UE 205 may be one embodiment of the remote unit 105, while the gNB 210 may be one embodiment of the base unit 110. Here, the gNB 210 may be a gNB or 5G base station. Although only one UE 205 is depicted, in other embodiments the gNB 210 may serve a plurality of UEs 205.

As depicted, the UE 205 transmits data, here the UL TB 215, and a first TTI over an UL channel, such as a PUSCH. The TTI may be a slot, a mini slot, or the like. The UL TB 215 may be for a URLLC service requiring shorter latency tolerance and higher transmission reliability than an eMBB service. As such, the UL TB 215 may be sent using grant-free UL transmission to satisfy the latency requirement. Further, in order to satisfy the reliability requirement, the UL TB 215 may be repeated K a total of times (to include the initial transmission), where K is a predetermined number greater than or equal to one.

However, it is inefficient for the UE 205 to continue transmission repetitions of the UL TB 215 once the gNB 210 successfully receives the UL TB 215. The gNB 210 responds to the UL TB 215 with a (DL) control signal 220, such as a DCI and/or a UL grant. Note that the gNB 210 sends the control signal 220 in a second, subsequent TTI. For more efficient resource use, the gNB 210 indicates to UE 205 that the control signal 220 corresponds to the received UL TB 215 and indicates whether the UL TB 215 was successfully received. The UE 205 determines whether the control signal 220 corresponds to the UL TB 215 and ceases any remaining transmission repetitions of the UL TB 215 upon the gNB 210 indicating that the UL TB 215 was successfully received. As used herein, the gNB 210 "successfully receives" the data by receiving the uplink signal containing the uplink data at its receiver and successfully decoding the uplink data from the uplink signal.

To facilitate early termination of UL transmission repetitions (e.g., in response to successful reception of the uplink data), the UE 205 needs to determine whether a received control signal 220 (e.g., UL grant) is for the UL TB 215. In one embodiment, the UE 205 attempts to discover whether a UL grant corresponds to the UL TB 215 immediately after it begins transmitting the UL TB 215 on the PUSCH in grant-free mode. In another embodiment, the UE 205 waits a predetermined amount of time after transmitting the UL TB 215 on the PUSCH before attempting to discover whether the UL grant corresponds to the UL TB 215.

If the control signal 220 corresponds to the UL TB 215, then the UE 205 continues to determine whether the control signal 220 is for scheduling a retransmission of the UL TB 215 (e.g., using grant-based transmission) or an indication to stop transmission repetition of the UL TB 215. Otherwise, if the control signal 220 is not corresponds to the UL TB 215, then the UE 205 transmits new data on the PUSCH according to a received UL grant. To prevent confusion, the UE 205 only sends one PUSCH in one TTI. Further, at the UE 205 a UL grant triggered PUSCH overrides any grant-free PUSCH in a given TTI.

Figure 5:
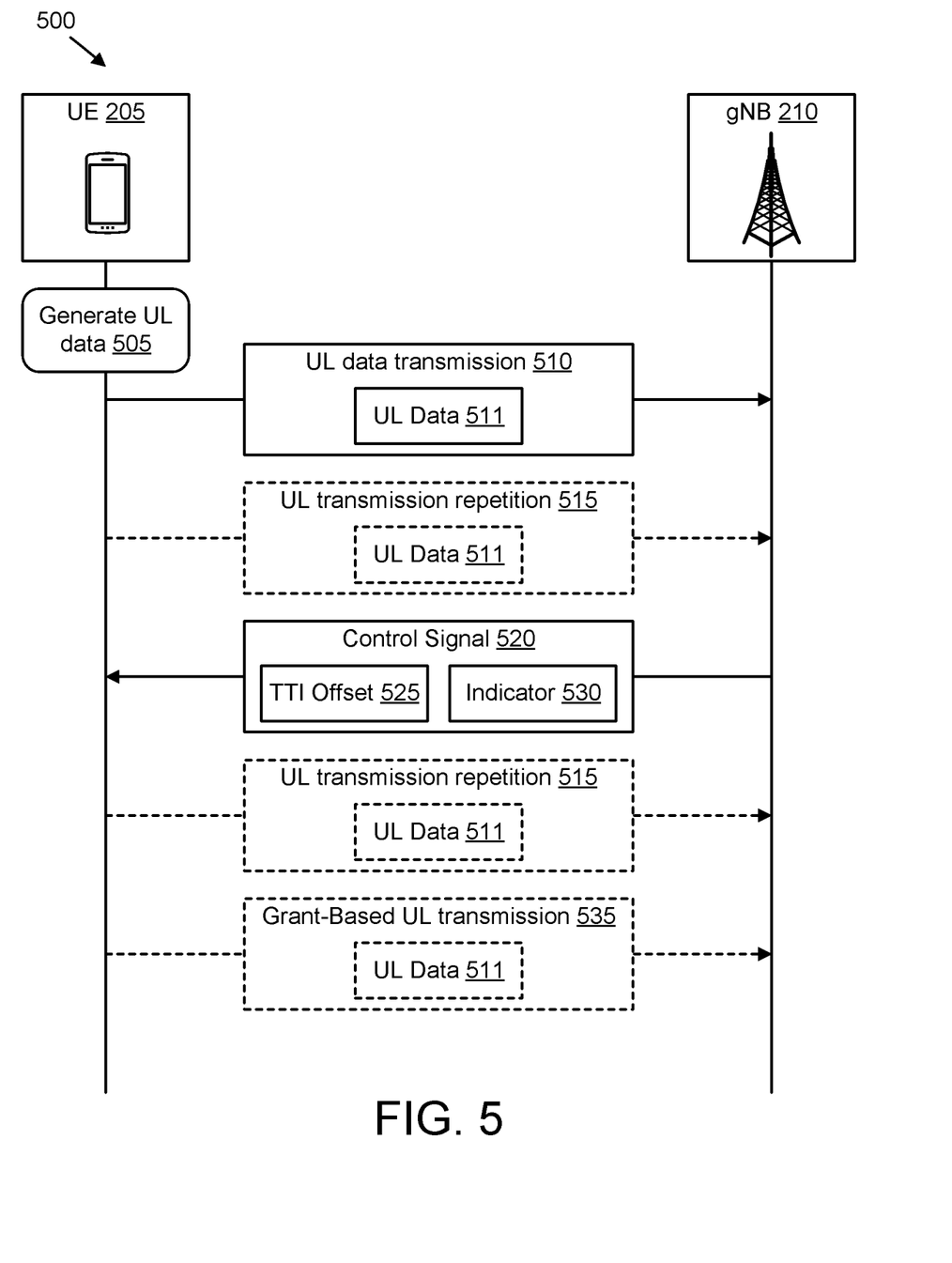
FIG. 5 is a block diagram illustrating one embodiment of early termination of uplink transmission repetition using an included TTI offset to indicate correspondence between a DL control signal and previously received UL data.
Figure 6:
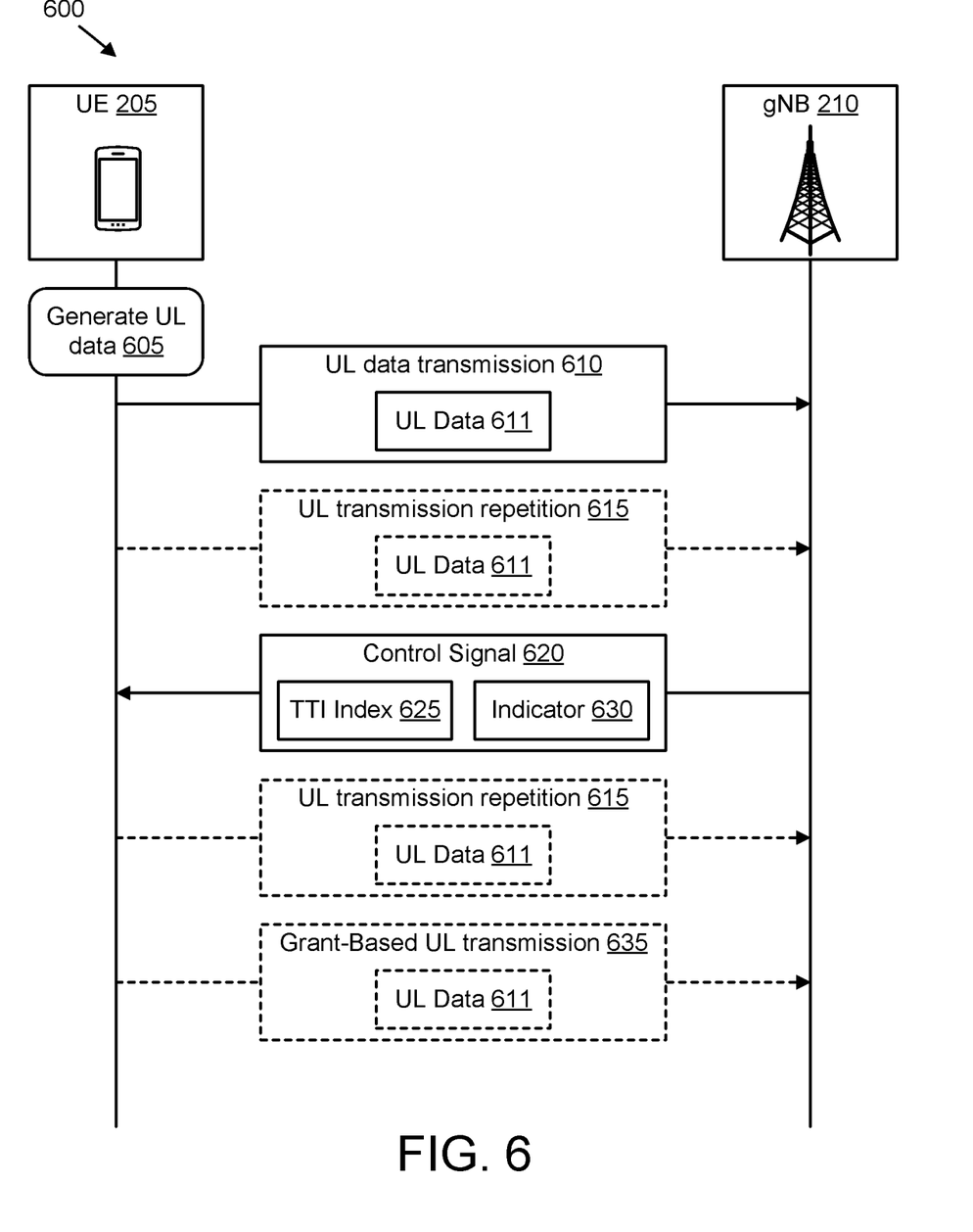
FIG. 6 is a block diagram illustrating one embodiment of early termination of uplink transmission repetition using an included TTI index to indicate correspondence between a DL control signal and previously received UL data.
Figure 7:
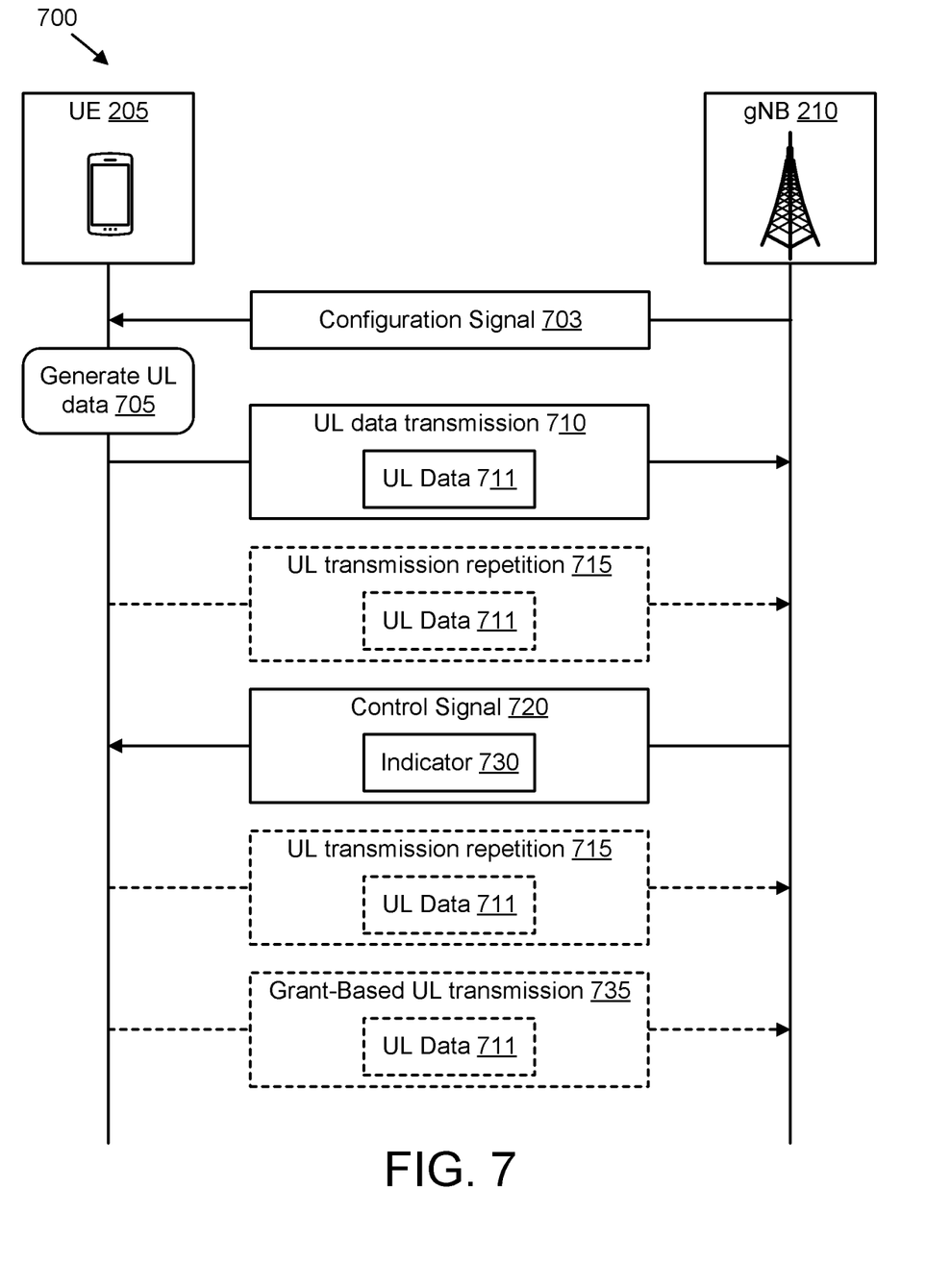
FIG. 7 is a block diagram illustrating one embodiment of early termination of uplink transmission repetition using a preconfigured TTI offset to indicate correspondence between a DL control signal and previously received UL data.

In some embodiments, the gNB 210 uses a bit field in the control signal 220 to implicitly indicate whether the control signal 220 corresponds to the UL TB 215. For example, a TTI offset and/or a TTI index of the control signal 220 may be used to implicitly indicate that the control signal 220 corresponds to the UL TB 215. To prevent confusion, the UE 205 and the gNB 210 maintain the same understanding on the meaning of a TTI offset. FIGS. 5-7 depict various embodiments of using the TTI offset and/or TTI index of the control signal 220 to implicitly indicate the correspondence.

After determining that the control signal 220 corresponds to the UL TB 215, the UE 205 examines the control signal 220 to determine whether the UL TB 215 was successfully received at the gNB 210. In some embodiments, the UE 205 reinterprets an NDI field in the control signal 220 as an ACK/NAK value. In contrast to conventional usage, then the NDI field here indicates whether the UL TB 215 was successfully received (e.g., using an ACK bit value) or was unsuccessfully received (e.g., using a NAK bit value). To prevent confusion, the UE 205 and the gNB 210 maintain the same understanding on the meaning of the NDI field. In one embodiment, the meaning of the NDI field, when the control signal 220 is sent in response to the UL TB 215, is predefined in a communication standard specification used by both the UE 205 and the gNB 210. In certain embodiments, the meaning of the NDI field, when reinterpreted as an ACK/NAK indication, is fixed. In other embodiments, the meaning of the NDI field may be preconfigured for the UE 205.

Figure 3:
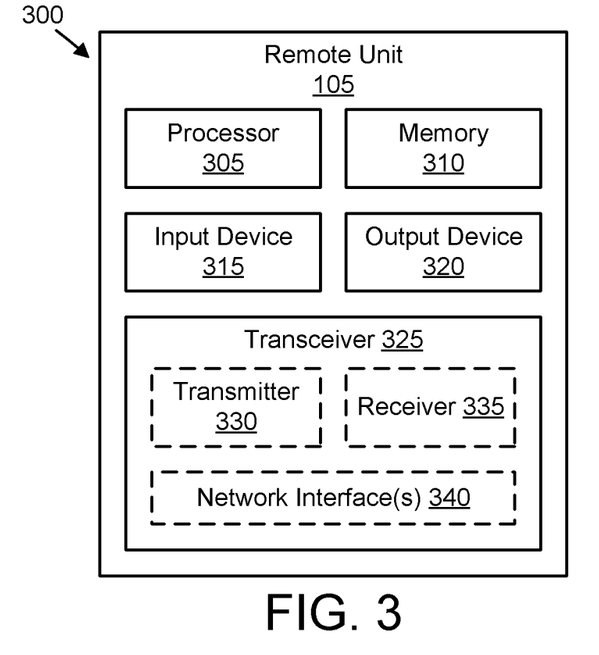
FIG. 3 is a schematic block diagram illustrating one embodiment of a computing device for early termination of uplink transmission repetition.

FIG. 3 depicts one embodiment of a remote apparatus 300 that may be used for early termination of uplink transmission repetition, according to embodiments of the disclosure. The remote apparatus 300 may be one embodiment of the remote unit 105 and/or UE 205, described above. Furthermore, the remote apparatus 300 may include a processor 305, a memory 310, an input device 315, an output device 320, a transceiver 325 for communicating with one or more base units 110.

As depicted, the transceiver 325 may include a transmitter 330 and a receiver 335. The transceiver 325 may also support one or more network interfaces 340, such as the Uu interface used to communicate with a gNB. In some embodiments, the input device 315 and the output device 320 are combined into a single device, such as a touchscreen. In certain embodiments, the remote apparatus 300 may not include any input device 315 and/or output device 320.

The processor 305, in one embodiment, may include any known controller capable of executing computer-readable instructions and/or capable of performing logical operations. For example, the processor 305 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 305 executes instructions stored in the memory 310 to perform the methods and routines described herein. The processor 305 is communicatively coupled to the memory 310, the input device 315, the output device 320, and the transceiver 325.

In some embodiments, the transmitter 330 transmits data (e.g., a UL TB) to a base unit 110 in a first TTI. The TTI may be a slot, a mini-slot, or other defined time interval. Here, the data is configured for transmission with a predetermined number of repetitions. For example, the transmitter 330 may be configured to send a total of 10 repetitions of the UL TB, each in a different TTI. In certain embodiments, the transmitter 330 transmits the data using a grant-free mechanism. In other embodiments, the transmitter 330 transmits the data on UL resources indicated in an UL grant. In one embodiment, the data sent in the first TTI is an initial transmission of the data. In another embodiment, the data sent in the first TTI is a retransmission of the data (e.g., a subsequent transmission repetition).

The receiver 335 receives a control signal (e.g., a DCI and/or UL grant) from the base unit 110 in a second TTI. Here, the second TTI occurs after the first TTI. In one embodiment, the second TTI is at least a minimum number of TTIs after the first TTI. In certain embodiments, the second TTI has the same duration as the first TTI.

In response to the receiver 335 receiving the control signal, the processor 305 determines whether the control signal corresponds to the data (e.g., is a response to the UL TB). If the control signal corresponds to the data, then the processor 305 determines whether to cease any remaining transmission repetitions of the data before the number of repetitions reaches the predetermined number (e.g., early termination of the UL transmission repetitions).

In some embodiments, the processor 305 determines whether the control signal corresponds to the data by identifying a TTI offset, calculating a TTI (e.g., a target TTI) from the second TTI and the identified TTI offset, and determining whether the calculated TTI matches to the first TTI. Here, the control signal corresponds to the data if the calculated TTI matching the first TTI.

In certain embodiments, the processor 305 identifies the TTI offset from a bit field contained in the control signal. In one embodiment, the value in the bit field corresponds to the amount of TTI offset. In another embodiment, the value in the bit field indicates a TTI offset from a set of TTI offsets. Here, the set of TTI offsets may be preconfigured by the base unit or predefined in a communication standard specification used by the remote apparatus 300 and the base unit 110, for example prior to the transmitter 330 sending the UL TB. In other embodiments, the TTI offset may be a fixed value (e.g., predefined in a telecommunications standard used by the remote apparatus 300) or semi-statically configured by the base unit 110. Here, the TTI offset is preconfigured by the base unit prior to the transmitter 330 transmitting the data.

In some embodiments, the processor 305 determines whether the control signal corresponds to the data by identifying a TTI index contained in the control signal. The processor 305 then determines whether the identified TTI index matches to the first TTI. Here, the control signal corresponds to the data in response to the identified TTI index matching the first TTI.

In certain embodiments, the transmitter 330 sends a transmission repetition of the UL TB in a third TTI prior to the receiver 335 receiving the control signal. Here, the processor 305 determines whether the control signal corresponds to the UL TB by determining whether the TTI offset points to the third TTI or whether the TTI index matches the third TTI.

Where the control signal corresponds to the UL data, the control signal includes an indicator for indicating whether the data is successfully received. In some embodiments, the processor 305 determines whether to cease any remaining transmission repetitions of the data before the number of repetitions reaches the predetermined number by interpreting the indicator to determine whether the data is successfully received. In certain embodiments, the indicator replaces the NDI field in the control signal. In such embodiments, the processor 305 reinterprets the NDI field as an ACK/NAK bit, such that the reinterpreted NDI indicates whether the data is successfully received. For example, a bit value of "1" may be an ACK indicating successful reception of the data, while a bit value of "0" may be a NAK indicating unsuccessful reception of the data.

In response to the indicator indicating that the data is successfully received, the transmitter 330 ceases at least one transmission repetition (e.g., all remaining transmission repetitions) of the data before the number of repetitions reaches the predetermined number. In one embodiment, the transmitter 330 continues repeating the data until the number of repetitions reaches the predetermined number in response to the indicator indicating that the data is not successfully received. In another embodiment, the transmitter 330 transmits the data based on scheduling of the control signal in response to the indicator indicating that the data is not successfully received.

The memory 310, in one embodiment, is a computer readable storage medium. In some embodiments, the memory 310 includes volatile computer storage media. For example, the memory 310 may include a RAM, including dynamic RAM ("DRAM"), synchronous dynamic RAM ("SDRAM"), and/or static RAM ("SRAM"). In some embodiments, the memory 310 includes non-volatile computer storage media. For example, the memory 310 may include a hard disk drive, a flash memory, or any other suitable non-volatile computer storage device. In some embodiments, the memory 310 includes both volatile and non-volatile computer storage media.

In some embodiments, the memory 310 stores data relating to early termination of uplink transmission repetition. For example, the memory 310 may store TTI values, TTI offsets, and the like. In some embodiments, the memory 310 also stores program code and related data, such as an operating system or other controller algorithms operating on the remote unit 105 and one or more software applications.

The input device 315, in one embodiment, may include any known computer input device including a touch panel, a button, a keyboard, a stylus, a microphone, or the like. In some embodiments, the input device 315 may be integrated with the output device 320, for example, as a touchscreen or similar touch-sensitive display. In some embodiments, the input device 315 includes two or more different devices, such as a keyboard and a touch panel. In certain embodiments, the input device 315 may include a camera for capturing images or otherwise inputting visual data.

The output device 320, in one embodiment, may include any known electronically controllable display or display device. The output device 320 may be designed to output visual, audible, and/or haptic signals. In some embodiments, the output device 320 includes an electronic display capable of outputting visual data to a user. For example, the output device 320 may include, but is not limited to, an LCD display, an LED display, an OLED display, a projector, or similar display device capable of outputting images, text, or the like to a user.

In certain embodiments, the output device 320 includes one or more speakers for producing sound. For example, the output device 320 may produce an audible alert or notification (e.g., a beep or chime). In some embodiments, the output device 320 includes one or more haptic devices for producing vibrations, motion, or other haptic feedback. In some embodiments, all or portions of the output device 320 may be integrated with the input device 315. For example, the input device 315 and output device 320 may form a touchscreen or similar touch-sensitive display. In other embodiments, the output device 320 may be located near the input device 315.

The transceiver 325 communicates with base units 110 of a mobile communication network. The transceiver 325 may include one or more transmitters 330 and one or more receivers 335. As discussed above, the transceiver 325 may support one or more the network interface 340 for communicating with the base unit 110.

Figure 4:
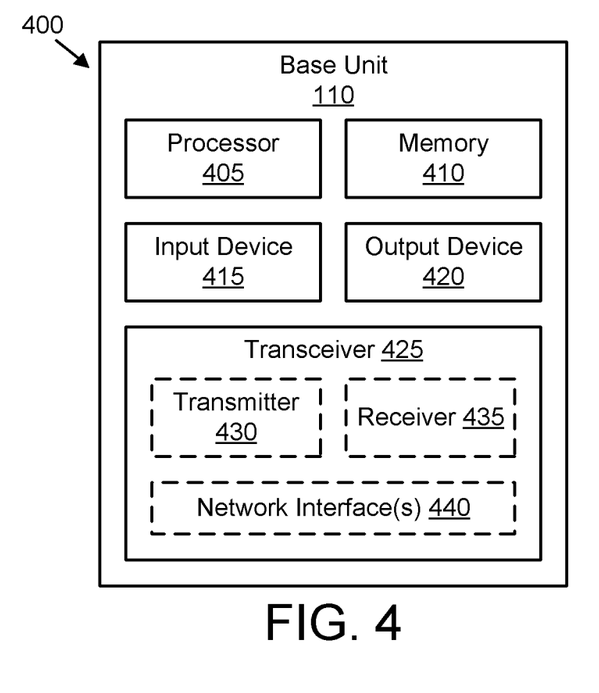
FIG. 4 is a schematic block diagram illustrating another embodiment of a computing device for early termination of uplink transmission repetition.

FIG. 4 depicts one embodiment of a base station apparatus 400 that may be used for early termination of uplink transmission repetition, according to embodiments of the disclosure. The base station apparatus 400 may be one embodiment of the base unit 110 and/or gNB 210, described above. Furthermore, the base station apparatus 400 may include a processor 405, a memory 410, an input device 415, an output device 420, a transceiver 425 for communicating with one or more remote units 105 and/or a mobile core network 130.

As depicted, the transceiver 425 may include a transmitter 430 and a receiver 435. The transceiver 425 may also support one or more network interfaces 440, such as the Uu interface, N2 interface, N3 interface, and/or other network interfaces suitable for communication with a remote unit and/or core network. In some embodiments, the input device 415 and the output device 420 are combined into a single device, such as a touchscreen. In certain embodiments, the base station apparatus 400 may not include any input device 415 and/or output device 420.

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the output device 420, and the transceiver 425.

In some embodiments, the receiver 435 receives data (e.g., a UL TB) from a remote unit 105, the data being sent in a first transmission time interval ("TTI"). In certain embodiments, the data is configured for transmission with a predetermined number of repetitions. The processor 405 determines whether the data is successfully received. The transmitter 430 transmits a control signal to the remote unit in a second TTI. Here, the control signal corresponds to the received data and includes an indicator for indicating whether the data is successfully received.

In certain embodiments, the processor 405 uses a TTI offset between the first TTI and the second TTI to indicate association between the control signal and the data. For example, the processor 405 may include a bit field in the control signal to indicate the TTI offset. In one embodiment, the bit field included in the control signal may indicate a TTI offset from a set of TTI offsets. Here, the set of TTI offsets may be preconfigured for the remote unit 105 or predefined in a communication standard specification used by the base station apparatus 400 and the remote unit 105. In other embodiments, the TTI offset between the first TTI and the second TTI is a fixed value or is preconfigured for the remote unit 105 before the remote unit 105 transmits the data. In certain embodiments, the processor 405 uses a TTI index of the first TTI to designate association between the control signal and the data. For example, the processor 405 may include a bit field in the control signal that specifies the TTI index of the first TTI to designate the association.

In some embodiments, the processor 405 indicates whether the data is successfully received by setting the value of an NDI field to an ACK or NAK value, based on whether the data (UL TB) was successfully received. This is in contrast to conventional NDI usage where a change in the value (e.g., the value toggling from a "0" to a "1", or vice versa) is used to indicate that new data is to be sent. Thus, the indicator may be realized by the remote unit 105 reinterpreting the NDI in the control signal. In other embodiments, the indicator for indicating whether the data is successfully received replaces the NDI in the control signal. In certain embodiments, the indicator is one bit in the control signal (e.g., an ACK/NAK bit) whose value indicates whether the data is successfully received. When the indicator indicates that the data is successfully received, then the remote unit 105 ceases transmission repetition of the data (e.g., UL TB) before the number of repetitions reaches the predetermined number. Otherwise, the remote unit 105 continues transmission repetition of the data until wither the predetermined number of repetitions occur or a new (e.g., subsequent) indicator in a later received control signal indicates that the data is successfully received.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media.

In some embodiments, the memory 410 stores data relating to early termination of uplink transmission repetition. For example, the memory 410 may store TTI values, TTI offsets, and the like. In some embodiments, the memory 410 also stores program code and related data, such as an operating system or other controller algorithms operating on the remote unit 105 and one or more software applications.

The input device 415, in one embodiment, may include any known computer input device including a touch panel, a button, a keyboard, a stylus, a microphone, or the like. In some embodiments, the input device 415 may be integrated with the output device 420, for example, as a touchscreen or similar touch-sensitive display. In some embodiments, the input device 415 includes two or more different devices, such as a keyboard and a touch panel. In certain embodiments, the input device 415 may include a camera for capturing images or otherwise inputting visual data.

The output device 420, in one embodiment, may include any known electronically controllable display or display device. The output device 420 may be designed to output visual, audible, and/or haptic signals. In some embodiments, the output device 420 includes an electronic display capable of outputting visual data to a user. For example, the output device 420 may include, but is not limited to, an LCD display, an LED display, an OLED display, a projector, or similar display device capable of outputting images, text, or the like to a user.

In certain embodiments, the output device 420 includes one or more speakers for producing sound. For example, the output device 420 may produce an audible alert or notification (e.g., a beep or chime). In some embodiments, the output device 420 includes one or more haptic devices for producing vibrations, motion, or other haptic feedback. In some embodiments, all or portions of the output device 420 may be integrated with the input device 415. For example, the input device 415 and output device 420 may form a touchscreen or similar touch-sensitive display. In other embodiments, the output device 420 may be located near the input device 415.

The transceiver 425 communicates with remote unit within a mobile communication network. The transceiver 425 may also communicate with a core network, such as the mobile core network 130. The transceiver 425 may include one or more transmitters 430 and one or more receivers 435. As discussed above, the transceiver 425 may supports one or more the network interface 440 for communicating with remote units 105 and the mobile core network 130.

FIG. 5 depicts a procedure 500 for early termination of uplink transmission repetition by using an included TTI offset to indicate correspondence between a DL control signal and previously received UL data (e.g., the UL TB 215). The procedure 500 involves communication between the UE 205 and the gNB 210. The UE 205 may be one embodiment of the remote unit 105 and/or the remote apparatus 300, discussed above. The gNB 210 may be one embodiment of the base unit 110 and/or the base station apparatus 400, discussed above.

As depicted, the procedure 500 begins and the UE 205 generates uplink data to be transmitted to the gNB 210 (see item 505). Accordingly, the UE 205 sends an uplink data transmission (item 510) to the gNB 210, the uplink data transmission including uplink data 511. Here, the uplink data 511 may be one embodiment of the UL TB 215 discussed above. In some embodiments, the UE 205 sends the uplink data transmission using grant-free UL transmission resources. For example, the gNB 210 may preconfigure a transmission resource pool for grant-free UL transmission for URLLC service.

The UE 205 is configured to send K repetitions of the uplink data 511, where K is a predetermined value (e.g., previously configured by the gNB 210). Here the K repetitions includes the initial uplink data transmission (item 510) and one or more subsequent transmission repetitions (item 515). Each subsequent transmission repetition includes a copy of the uplink data 511. Here, the initial transmission is sent on a first TTI, while the one or more subsequent transmission repetitions are send on subsequent TTIs.

After receiving the initial uplink data transmission (or a subsequent transmission repetition), the gNB 210 determines whether the uplink data 511 is successfully received. The uplink data 511 is successfully received when the gNB 210 is able to decode it. Similarly, the uplink data 511 is not successfully received when the gNB 210 is unable to decode it. Next, the gNB 210 generates a control signal 520, such as a DCI and/or UL grant, for transmission to the UE 205. As depicted, the control signal 520 includes a TTI offset field 525 and an indicator 530. The indicator 530 indicates whether the uplink data 511 is successfully received at the gNB 210.

The TTI offset is a dynamic indication of a TTI to which the control signal 520 corresponds (e.g., the TTI of the initial uplink data transmission or a subsequent transmission repetition). To indicate that the control signal 520 corresponds to the initial uplink data transmission, the gNB 210 sets the bits in the TTI offset field 525 to a value that points to the TTI of the initial uplink data transmission. For example, if the initial uplink data transmission is sent during a first TTI having a value of "Z" and the control signal to 220 is transmitted during a second TTI having a value of "Y", then the gNB 210 calculates a TTI offset of "X" such that "Y"−"X"="Z". To indicate that the control signal 520 corresponds to a subsequent transmission repetition, the gNB 210 sets the bits in the TTI offset field 525 to a value that points to the TTI of the subsequent transmission repetition.

The TTI offset between the UE 205 transmitting the grant-free PUSCH (e.g., the initial uplink data transmission at 510 or a subsequent transmission repetition at 515) and the gNB 210 transmitting the control signal 520 is dependent on processing capabilities of the UE 205 and gNB 210 as well as latency requirements of the URLLC service. For example, if the gNB 210 fails to decode the uplink data 511, the gNB need to schedule an uplink resource for the UE 205 to retransmit the uplink data 511 as soon as possible. Further, if the uplink data 511 is successfully decoded at the gNB, then the gNB 210 to send an acknowledgment (e.g., an ACK) to the UE 205 for the UE 205 to stop transmission repetition of the uplink data 511 before the number of repetitions (e.g., number of total transmissions of the uplink data 511) reaches K. In some embodiments, the TTI offset field 525 is a two bit value covering up to 4 TTIs of offset. In other embodiments, the TTI offset field 525 indicates a particular TTI offset from a set of TTI offsets. Here, the set of TTI offsets may be preconfigured by the gNB 210 or predefined in a communication standard specification used by the UE 205 and gNB 210.

Upon receiving control signal 520, the UE 205 identifies the TTI offset field 525 (e.g., having the value "X") and identifies the TTI (e.g., of value "Y") of the control signal 520. The UE 205 then calculates a target TTI of "Y"−"X" and determines whether the target TTI matches the first TTI of the initial uplink data transmission (e.g., "Z") or the TTI of a subsequent transmission repetition. Where the target TTI matches the TTI of a transmission of the uplink data 511, then the UE 205 determines that the control signal 520 corresponds to the initial uplink data transmission. Otherwise, if the target TTI does not match the TTI of the initial uplink data transmission at 510 or a subsequent transmission repetition at 515, then the UE 205 determines the control signal 520 does not correspond to the uplink data 511 and interprets the control signal 520 conventionally.

In the depicted embodiment, the control signal 520 corresponds to the initial uplink data transmission (item 510) and the UE 205 examines the indicator 530 to determine whether the uplink data 511 was successfully received by the gNB 210. In certain embodiments, the indicator 530 replaces the NDI field in an UL grant. Typically, the NDI field contains one bit indicating whether the UL grant is for new data or is to be used for UL transmission repetition. However, when the indicator 530 replaces the NDI field, the corresponding bit is interpreted as ACK/NAK bit. In one embodiment, a bit value of "1" in the NDI field indicates the uplink data 511 was successfully received ("ACK") while a bit value of "0" in the NDI field indicates that the uplink data 511 was unsuccessfully received ("NAK"). In the case of ACK, the UE 205 terminates transmission repetition of uplink data 511. However, in the case of NAK, the UE 205 retransmits the uplink data 511. In one embodiment, the UE 205 retransmits the uplink data 511 using grant-free transmission repetition. Here, the UE 205 continues transmission repetition 515 of the uplink data 511 until either receiving subsequent indication of successful reception or until the number of repetitions reaches K. In other embodiments, the UE 205 retransmits the uplink data 511 using grant-based transmission 535, for example using UL resources scheduled in the control signal 520.

FIG. 6 depicts a procedure 600 for early termination of uplink transmission repetition by using an included TTI index to indicate correspondence between a DL control signal and previously received UL data (e.g., the UL TB 215). The procedure 600 involves communication between the UE 205 and the gNB 210. The UE 205 may be one embodiment of the remote unit 105 and/or the remote apparatus 300, discussed above. The gNB 210 may be one embodiment of the base unit 110 and/or the base station apparatus 400, discussed above.

As depicted, the procedure 600 begins and the UE 205 generates uplink data to be transmitted to the gNB 210 (see item 605). Accordingly, the UE 205 sends an uplink data transmission (item 610) to the gNB 210, the uplink data transmission including uplink data 611. Here, the uplink data 611 may be one embodiment of the UL TB 215 discussed above. In some embodiments, the UE 205 sends the uplink data transmission using grant-free UL transmission resources. For example, the gNB 210 may preconfigure a transmission resource pool for grant-free UL transmission for URLLC service.

The UE 205 is configured to send K repetitions of the uplink data 611, where K is a predetermined value (e.g., previously configured by the gNB 210). Here the K repetitions of the uplink data 611 includes the initial uplink data transmission (item 610) and one or more subsequent transmission repetitions (item 615). Each subsequent transmission repetition includes a copy of the uplink data 611. Here, the initial transmission is sent on a first TTI, while the one or more subsequent transmission repetitions are send on subsequent TTIs.

After receiving the initial uplink data transmission (or a subsequent transmission repetition), the gNB 210 determines whether the uplink data 611 is successfully received. The uplink data 611 is successfully received when the gNB 210 is able to decode it. Similarly, the uplink data 611 is not successfully received when the gNB 210 is unable to decode it. Next, the gNB 210 generates a control signal 620, such as a DCI and/or UL grant, for transmission to the UE 205. As depicted, the control signal 620 includes a TTI index field 625 and an indicator 630. The indicator 630 indicates whether the uplink data 611 is successfully received at the gNB 210.

The TTI index field 625 explicitly indicates a TTI to which the control signal 620 corresponds (e.g., the TTI of the initial uplink data transmission or a subsequent transmission repetition). To indicate that the control signal 620 corresponds to the initial uplink data transmission, the gNB 210 sets the bits in the TTI index field 625 to match the TTI of the initial uplink data transmission. For example, if the initial uplink data transmission is sent during a first TTI having a value of "Z", then the gNB 210 sets the TTI index field 625 to also have the value "Z". This indicates that the control signal 620 corresponds to a PUSCH transmitted during the first TTI. To indicate that the control signal 620 corresponds to a subsequent transmission repetition, the gNB 210 sets the bits in the TTI index field 625 to a value that matches with the TTI of the subsequent transmission repetition.

The interval between the UE 205 transmitting the grant-free PUSCH (e.g., the initial uplink data transmission at 610 or a subsequent transmission repetition at 615) and the gNB 210 transmitting the control signal 620 is dependent on processing capabilities of the UE 205 and gNB 210 as well as latency requirements of the URLLC service. Generally, the gNB 210 responds to the uplink data transmission with the control signal 620 as soon as possible. If the uplink data 611 is successfully decoded at the gNB, then the gNB 210 to send an acknowledgment (e.g., an ACK) to the UE 205 for the UE 205 to stop transmission repetition of the uplink data 611 before the number of repetitions (e.g., number of total transmissions of the uplink data 611) reaches K.

The number of bits needed for the TTI index field 625 is dependent on the number of TTI's within a radio frame. For example, a radio frame that includes 20 TTIs would require a TTI index field 625 with the length of five bits. Here, the length of the TTI index field 625 may be predefined in the communication standard specification or preconfigured by the gNB 210. As compared to the TTI offset field 525, the TTI index field 625 may require more bits to indicate correspondence to particular UL transmission.

Upon receiving control signal 620, the UE 205 identifies the TTI index field 625 (e.g., having the value "Z") and determines whether the TTI of the initial uplink data transmission (or the TTI of a subsequent transmission repetition) matches the value in the TTI index field 625. Where the TTI index field 625 matches the TTI of a transmission of the uplink data 611, the UE 205 determines that the control signal 620 corresponds to the uplink data 611. Otherwise, if the target TTI does not match the TTI of the initial uplink data transmission at 610 or a subsequent transmission repetition at 615, then the UE 205 determines the control signal 620 does not correspond to the uplink data 611 and interprets the control signal 620 conventionally.

In the depicted embodiment, the control signal 620 corresponds to the initial uplink data transmission (item 610) and the UE 205 examines the indicator 630 to determine whether the uplink data 611 was successfully received by the gNB 210. In certain embodiments, the indicator 630 replaces the NDI field in an UL grant. Typically, the NDI field contains one bit indicating whether the UL grant is for new data or is to be used for UL transmission repetition. However, when the indicator 630 replaces the NDI field, the corresponding bit is interpreted as ACK/NAK bit. In one embodiment, a bit value of "1" in the NDI field indicates the uplink data 611 was successfully received ("ACK") while a bit value of "0" in the NDI field indicates that the uplink data 611 was unsuccessfully received ("NAK"). In the case of ACK, the UE 205 terminates transmission repetition of uplink data 611. However, in the case of NAK, the UE 205 retransmits the uplink data 611. In one embodiment, the UE 205 retransmits the uplink data 611 using grant-free transmission repetition. Here, the UE 205 continues transmission repetition 615 of the uplink data 611 until either receiving subsequent indication of successful reception or until the number of repetitions reaches K. In other embodiments, the UE 205 retransmits the uplink data 611 using grant-based transmission 635, for example using UL resources scheduled in the control signal 620.

FIG. 7 depicts a procedure 700 for early termination of uplink transmission repetition by using a predetermined TTI offset to indicate correspondence between a DL control signal and previously received UL data (e.g., the UL TB 215). The procedure 700 involves communication between the UE 205 and the gNB 210. The UE 205 may be one embodiment of the remote unit 105 and/or the remote apparatus 300, discussed above. The gNB 210 may be one embodiment of the base unit 110 and/or the base station apparatus 400, discussed above.

As depicted, the procedure 700 begins and the UE 205 receives a configuration signal from the gNB 210 (see item 703). The configuration signal includes the predetermined TTI offset value. At a later point in time, the UE 205 generates uplink data to be transmitted to the gNB 210 (see item 705). Accordingly, the UE 205 sends an uplink data transmission (item 710) to the gNB 210, the uplink data transmission including uplink data 711. Here, the uplink data 711 may be one embodiment of the UL TB 215 discussed above. In some embodiments, the UE 205 sends the uplink data transmission using grant-free UL transmission resources. For example, the gNB 210 may preconfigure a transmission resource pool for grant-free UL transmission for URLLC service.

The UE 205 is configured to send K repetitions of the uplink data 711, where K is a predetermined value (e.g., previously configured by the gNB 210). Here the K repetitions includes the initial uplink data transmission (item 710) and one or more subsequent transmission repetitions (item 715). Each subsequent transmission repetition includes a copy of the uplink data 711. Here, the initial transmission is sent on a first TTI, while the one or more subsequent transmission repetitions are send on subsequent TTIs.

After receiving the initial uplink data transmission (or a subsequent transmission repetition), the gNB 210 determines whether the uplink data 711 is successfully received. The uplink data 711 is successfully received when the gNB 210 is able to decode it. Similarly, the uplink data 711 is not successfully received when the gNB 210 is unable to decode it. Next, the gNB 210 generates a control signal 720, such as a DCI and/or UL grant, for transmission to the UE 205. As depicted, the control signal 720 includes an indicator 730. Here, the control signal 720 does not require a TTI offset field because the TTI offset is preconfigured by the gNB 210. The indicator 730 indicates whether the uplink data 711 is successfully received at the gNB 210.

To indicate that the control signal 720 corresponds to the initial uplink data transmission, the gNB 210 transmits the control signal 720 during a specific TTI based on the preconfigured TTI offset. For example, if the initial uplink data transmission is sent during a first TTI having a value of "Z" and the preconfigured TTI offset has a value of "X", then the gNB 210 transmits the control signal 720 during a second TTI having a value of "Y", such that "Y"–"X"="Z". To indicate that the control signal 720 corresponds to a subsequent transmission repetition, the gNB 210 transmits the control signal 720 during a specific TTI based on the preconfigured TTI offset and on the TTI of a subsequent transmission repetition.

The TTI offset between the UE 205 transmitting the grant-free PUSCH (e.g., the initial uplink data transmission at 710 or a subsequent transmission repetition at 715) and the gNB 210 transmitting the control signal 720 is dependent on processing capabilities of the UE 205 and gNB 210 as well as latency requirements of the URLLC service. Generally, the configured TTI offset is set as the smallest interval needed (e.g., based on the processing capabilities the UE 205 and the gNB 210). Further, if the uplink data 711 is successfully decoded at the gNB, then the gNB 210 to send an acknowledgment (e.g., an ACK) to the UE 205 for the UE 205 to stop transmission repetition of the uplink data 711 before the number of repetitions (e.g., number of total transmissions of the uplink data 711) reaches K.

Upon receiving control signal 720, the UE 205 identifies the TTI (e.g., of value "Y") of the control signal 720 and calculates a target TTI of "Y"–"X" using the preconfigured TTI offset of "X". If the target TTI matches the first TTI (e.g., TTI of "Z"), then the UE 205 determines that the control signal 720 corresponds to the initial uplink data transmission. If the target TTI matches the TTI of a subsequent transmission repetition, the UE 205 determines that the control signal 720 corresponds to subsequent transmission repetition. Otherwise, if the target TTI does not match the TTI of a transmission of the uplink data 711, then the UE 205 determines the control signal 720 does not correspond to the uplink data 711 and interprets the control signal 720 conventionally.

In the depicted embodiment, the control signal 720 corresponds to the initial uplink data transmission (item 710) and the UE 205 examines the indicator 730 to determine whether the uplink data 711 was successfully received by the gNB 210. In certain embodiments, the indicator 730 replaces the NDI field in an UL grant. Typically, the NDI field contains one bit indicating whether the UL grant is for new data or is to be used for UL transmission repetition. However, when the indicator 730 replaces the NDI field, the corresponding bit is interpreted as ACK/NAK bit. In one embodiment, a bit value of "1" in the NDI field indicates the uplink data 711 was successfully received ("ACK") while a bit value of "0" in the NDI field indicates that the uplink data 711 was unsuccessfully received ("NAK"). In the case of ACK, the UE 205 terminates transmission repetition of uplink data 711. However, in the case of NAK, the UE 205 retransmits the uplink data 711. In one embodiment, the UE 205 retransmits the uplink data 711 using grant-free transmission repetition. Here, the UE 205 continues transmission repetition 715 of the uplink data 711 until either receiving subsequent indication of successful reception or until the number of repetitions reaches K. In other embodiments, the UE 205 retransmits the uplink data 711 using grant-based transmission 735, for example using UL resources scheduled in the control signal 720.

Figure 8:
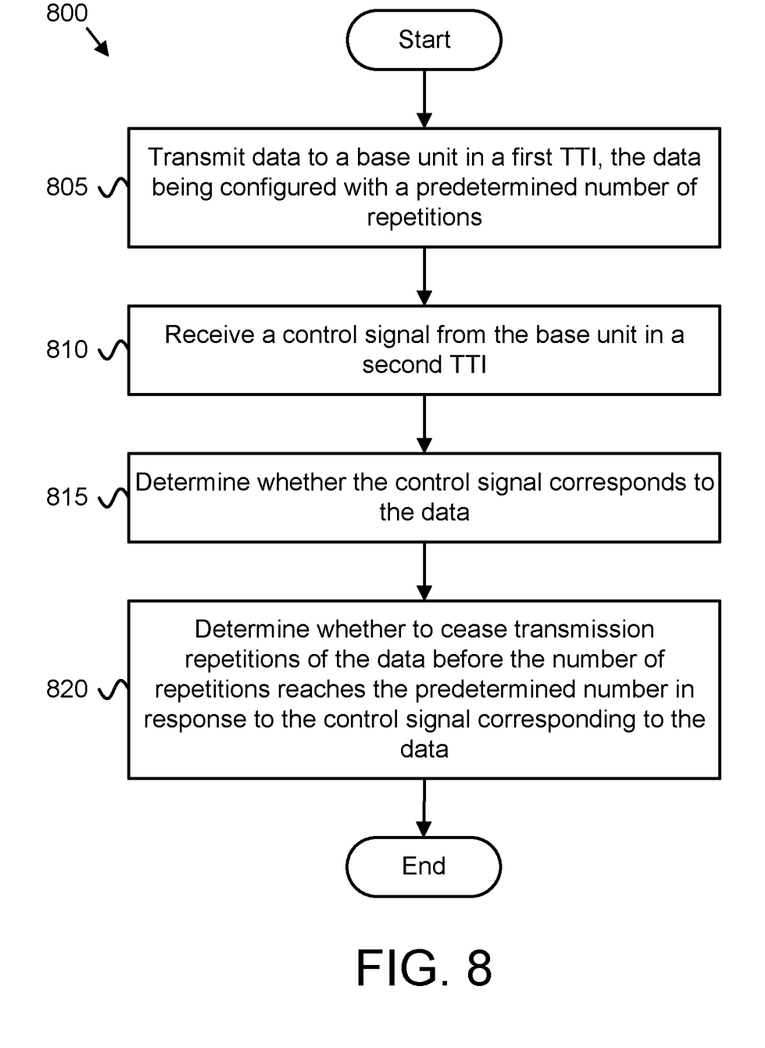
FIG. 8 is a schematic flow chart diagram illustrating one embodiment of a method for early termination of uplink transmission repetition

FIG. 8 depicts one embodiment of a method 800 for early termination of uplink transmission repetition, according to embodiments of the disclosure. In some embodiments, the method 800 is performed by a remote unit, such as the remote unit 105, UE 205, and/or the remote apparatus 300, described above. In certain embodiments, the method 800 may be performed by a processor executing program code, for example, a microcontroller, a microprocessor, a CPU, a GPU, an auxiliary processing unit, a FPGA, or the like.

The method 800 begins and transmits 805 data to a base unit in a first TTI. In some embodiments, the data is a UL TB. In certain embodiments, the data (e.g., UL TB) is configured for transmission with a predetermined number of repetitions. For example, the uplink data may be initially transmitted on a first TTI and configured to be retransmitted during one or more additional TTIs. In one embodiment, the transmitting 805 the data in the first TTI includes sending an initial transmission of the data. In another embodiment, the transmitting 805 the data in the first TTI includes sending a retransmission of the data (e.g., a subsequent transmission repetition). The method 800 includes receiving 810 a control signal from the base unit in a second TTI. Here, the second TTI is later than the first TTI. In certain embodiments, the control signal is a DCI and/or a UL grant.

The method 800 includes determining 815 whether the control signal corresponds to the data. In certain embodiments, determining 815 whether the control signal corresponds to the data includes identifying a TTI index contained in the control signal and determining whether the identified TTI index matches to the first TTI (or to the TTI of a transmission repetition of the data). Here, the control signal corresponds to the data in response to the identified TTI index matching the first TTI (or the TTI of a transmission repetition).

In some embodiments, determining 815 whether the control signal corresponds to the data includes identifying a TTI offset, calculating a TTI from the second TTI and the identified TTI offset, and determining whether the calculated TTI matches to the first TTI (or to the TTI of a transmission repetition of the data). Here, the control signal corresponds to the data in response to the calculated TTI matching the first TTI (or the TTI of a transmission repetition). In certain embodiments, identifying the TTI offset comprises identifying the TTI offset from a bit field contained in the control signal. In one embodiment, the bit field contained in the control signal indicates a specific TTI offset from a set of TTI offsets. Here, the set of TTI offsets may be preconfigured by the base unit or predefined in the communication standard specification. In other embodiments, the TTI offset is a fixed value. In another embodiment, the TTI offset is preconfigured by the base unit prior to transmitting 805 the data.

The method 800 also includes determining 820 whether to cease at least one transmission repetition of the data before the number of repetitions reaches the predetermined number (e.g., whether cease any remaining transmission repetitions), in response to the control signal corresponding to the data. In some embodiments, the control signal comprises an indicator for indicating whether the data is successfully received.

In such embodiments, determining 820 whether to cease at least one transmission repetition of the data before the number of repetitions reaches the predetermined number includes determining, from the indicator, whether the data is successfully received and ceasing any remaining transmission repetitions of the data number in response to the indicator indicating that the data is successfully received. In one embodiment, determining 820 whether to cease at least one transmission repetitions of the data before the number of repetitions reaches the predetermined number includes continuing transmission repetitions of the data until the number of repetitions reaches the predetermined number in response to the indicator indicating that the data is not successfully received. In another embodiment, determining 820 whether to cease at least one transmission repetitions of the data before the number of repetitions reaches the predetermined number includes transmitting the data based on scheduling of the control signal in response to the indicator indicating that the data is not successfully received.

The indicator may be an NDI in the control signal, wherein the NDI is reinterpreted to determine whether the data is successfully received. The method 800 ends.

Figure 9:
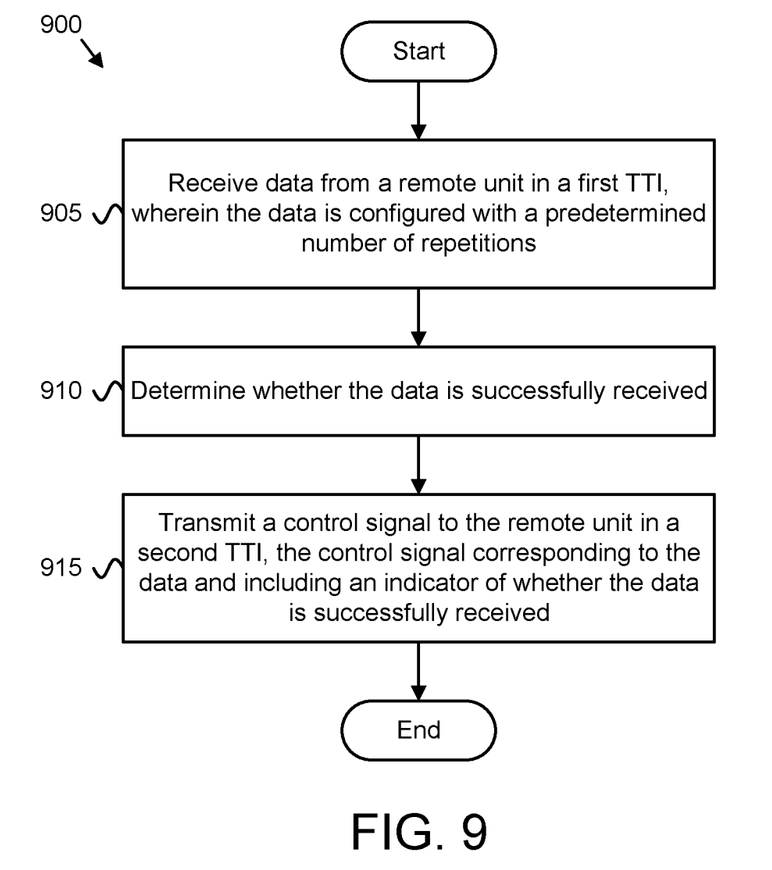
FIG. 9 is a schematic flow chart diagram illustrating another embodiment of a method for early termination of uplink transmission repetition.

FIG. 9 is a schematic flow chart diagram illustrating one embodiment of a method 900 for early termination of uplink transmission repetition, according to embodiments of the disclosure. In some embodiments, the method 900 is performed by a base unit, such as the base unit 110, the gNB 210, and or the base station apparatus 400. In certain embodiments, the method 900 may be performed by a processor executing program code, for example, a microcontroller, a microprocessor, a CPU, a GPU, an auxiliary processing unit, a FPGA, or the like.

The method 900 begins and receives 905 data from a remote unit in a first transmission time interval ("TTI"), wherein the data is configured for transmission with a predetermined number of repetitions. For example, the uplink data may be initially transmitted in the first TTI and configured to be retransmitted during one or more additional TTIs. In one embodiment, receiving 905 the data includes receiving an uplink signal containing the uplink data at a receiver. The method 900 includes determining 910 whether the data is successfully received. Here, the data is determined to be "successfully received" when the data from the uplink signal is successfully decoded. In one embodiment, the data received in the first TTI is an initial transmission of the data. In another embodiment, the data received in the first TTI is a retransmission of the data (e.g., a subsequent transmission repetition).

The method 900 includes transmitting 915 a control signal to the remote unit in a second TTI, the control signal corresponding to the data and including an indicator of whether the data is successfully received. In certain embodiments, the control signal uses a TTI offset between the first TTI and the second TTI to indicate association between the control signal and the data. In one embodiment, the control signal includes a bit field for indicating the TTI offset. For example, the bit field included in the control signal may indicate a specific TTI offset from a set of TTI offsets, the set of TTI offsets being preconfigured for the remote unit or predefined in the communication standard specification. In other embodiments, the TTI offset between the first TTI and the second TTI is a fixed value or is preconfigured for the remote unit before the remote unit transmits the data. In some embodiments, the control signal includes a bit field for indicating a TTI index of the first TTI to designate association between the control signal and the data.

In one embodiment, the indicator for indicating whether the data is successfully received is realized by repurposing a NDI field in the control signal. Here, the value in the NDI field is used to indicate whether the data is successfully received. In another embodiment, the NDI field is replaced by the indicator. In certain embodiments, the indicator in the control signal may be one bit (e.g., an ACK/NAK bit) whose value indicates whether the data is successfully received. When the indicator indicates that the data is successfully received, then the remote unit ceases transmission repetition of the data (e.g., UL TB) before the number of repetitions reaches the predetermined number. The method 900 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment ("UE"), comprising:
    transmitting data to a base station in a first transmission time interval ("TTI"), wherein the data is configured for transmission with a predetermined number of repetitions;
    receiving a control signal from the base station in a second TTI; and
    determining whether the control signal corresponds to the data;

in response to a determination that the control signal corresponds to the data, ceasing transmission of at least one repetition of the data before a transmitted number of repetitions reaches the predetermined number in response to determining that the control signal fails to correspond to the data, continuing to transmit at least one additional repetition of the data.

2. The method of claim 1, wherein determining whether the control signal corresponds to the data comprises:
identifying a TTI offset,
calculating a TTI from the second TTI and the identified TTI offset, and
determining whether the calculated TTI matches to the first TTI,
wherein the control signal corresponds to the data in response to the calculated TTI matching the first TTI and wherein the control signal fails to correspond to the data in response to the calculated TTI failing to match the first TTI.

3. The method of claim 2, wherein identifying the TTI offset comprises identifying the TTI offset from a bit field contained in the control signal.

4. The method of claim 3, wherein the bit field contained in the control signal indicates a TTI offset from a set of TTI offsets, the set of TTI offsets being preconfigured by the base station.

5. The method of claim 2, wherein the TTI offset is a fixed value.

6. The method of claim 2, wherein the TTI offset is preconfigured by the base station prior to transmitting the data.

7. The method of claim 1, wherein determining whether the control signal corresponds to the data comprises:
identifying a TTI index contained in the control signal, and
determining whether the identified TTI index matches to the first TTI,
wherein the control signal corresponds to the data in response to the identified TTI index matching the first TTI and wherein the control signal fails to correspond to the data in response to the identified TTI index failing to match the first TTI.

8. The method of claim 1, wherein the control signal comprises an indicator for indicating whether the data is successfully received,
wherein ceasing the transmission of the at least one repetition of the data before the transmitted number of repetitions reaches the predetermined number of repetitions comprises:
determining, from the indicator, whether the data is successfully received,
ceasing at least one transmission repetition of the data before the number of repetitions reaches the predetermined number in response to the indicator indicating that the data is successfully received, and
continuing to repeat the data until the number of repetitions reaches the predetermined number in response to the indicator indicating that the data is not successfully received.

9. The method of claim 8, wherein determining, from the indicator, whether the data is successfully received comprises reinterpreting a new data indicator ("NDI") in the control signal, the reinterpreted NDI indicating whether the data is successfully received.

10. The method of claim 1, wherein the control signal comprises an indicator for indicating whether the data is successfully received,
wherein ceasing the transmission of the at least one repetition of the data before the transmitted number of repetitions reaches the predetermined number of repetitions comprises:
determining, from the indicator, whether the data is successfully received,
ceasing at least one transmission repetition of the data before the number of repetitions reaches the predetermined number in response to the indicator indicating that the data is successfully received, and
transmitting the data based on scheduling of the control signal in response to the indicator indicating that the data is not successfully received.

11. The method of claim 10, wherein determining, from the indicator, whether the data is successfully received comprises reinterpreting a new data indicator ("NDI") in the control signal, the reinterpreted NDI being the indicator.

12. A method performed by a base station, comprising:
receiving data from a user equipment ("UE") in a first transmission time interval ("TTI"), wherein the data is configured for transmission with a predetermined number of repetitions;
determining whether the data is successfully received; and
transmitting a control signal, corresponding to the data, to the UE in a second TTI, wherein the control signal comprises an indicator for indicating whether the data is successfully received, and wherein receipt of one or more repetitions of the data is ceased subsequent to transmission of the control signal corresponding to the data.

13. The method of claim 12, wherein the control signal uses a TTI offset between the first TTI and the second TTI to indicate association between the control signal and the data.

14. The method of claim 13, wherein the control signal includes a bit field for indicating the TTI offset.

15. The method of claim 14, wherein the bit field included in the control signal indicates a TTI offset from a set of TTI offsets, the set being preconfigured for the UE.

16. The method of claim 13, wherein the TTI offset between the first TTI and the second TTI is a fixed value.

17. The method of claim 13, wherein the TTI offset is preconfigured for the UE before the UE transmits the data.

18. The method of claim 12, wherein the control signal includes a bit field for indicating a TTI index of the first TTI to designate association between the control signal and the data.

19. The method of claim 12, wherein the indicator for indicating whether the data is successfully received replaces a new data indicator ("NDI") in the control signal.

20. The method of claim 12, wherein the indicator for indicating whether the data is successfully received is realized by one bit in the control signal.

* * * * *